United States Patent

Werner

[11] 3,879,802
[45] Apr. 29, 1975

[54] HINGE FITTING FOR ADJUSTABLY CONNECTING A SEAT AND A BACKREST TO EACH OTHER, ESPECIALLY FOR MOTOR VEHICLES

[75] Inventor: Paul Werner, Remscheid, Germany

[73] Assignee: Fritz Keiper, Remscheid-Hasten, Germany

[22] Filed: May 29, 1974

[21] Appl. No.: 474,428

[30] Foreign Application Priority Data
June 1, 1973 Germany.......................... 2328022

[52] U.S. Cl................................. 16/144; 297/367
[51] Int. Cl............................................. E05d 11/10
[58] Field of Search............ 16/139, 144, 141, 145, 16/147, 175, 189; 297/367, 373

[56] References Cited
UNITED STATES PATENTS
3,737,946  6/1973  Giuliani ............................... 16/139

FOREIGN PATENTS OR APPLICATIONS
1,296,060  5/1962  France .......................... 297/367
1,347,823  11/1963  France ........................... 297/373

*Primary Examiner*—Richard J. Scanlan, Jr.
*Attorney, Agent, or Firm*—Michael S. Striker

[57] ABSTRACT

A hinge fitting for adjustably connecting a seat element and a backrest element, especially for motor vehicle seats, in which a first hinge member connectable with one of the elements is provided with a ring gear having inwardly directed teeth and in which three radially extending locking bars, preferably displaced through 120° from each other and provided at the outer ends with teeth adapted to meshingly engage the teeth of the ring gear, are mounted on the other hinge member and guided for movement in radial direction. First and second cam means coaxially arranged with the ring gear cooperate with the locking bars to respectively move the latter in radially inward and outward directions to engage the teeth thereon with and to disengage the teeth from the teeth of the ring gear.

14 Claims, 3 Drawing Figures

HINGE FITTING FOR ADJUSTABLY CONNECTING A SEAT AND A BACKREST TO EACH OTHER, ESPECIALLY FOR MOTOR VEHICLES

BACKGROUND OF THE INVENTION

The present invention relates to a hinge fitting for adjustably connecting a seat element and a backrest element of a seat, especially for motor vehicle seats, which comprises two hinge members respectively connected with the seat element and the backrest element, in which one of the hinge members is provided with a ring gear having inwardly directed teeth and in which the other hinge member carries a plurality of substantially radially movable locking members which are movable in radially outward direction by a turnable cam. In a known hinge fitting of the aforementioned kind there are provided two substantially semicircular toothed jaws which are biased by a spring in radially inward direction to disengage the teeth thereon from the teeth of the ring gear and which can be brought into an engaged position against the biasing force of the spring by turning a cam in one direction. This construction has the disadvantage that the locking jaws can be brought to the unlocking position only when the spring will exert the necessary force, and if the spring weakens or breaks after extended use, the hinge fitting will become inoperative. In another known hinge fitting of the aforementioned kind, one of the hinge members is likewise provided with a ring gear having radially inwardly extending teeth and the other hinge member again carries a plurality of locking jaws or locking bars biased by a spring in radially inward direction and movable into engagement with the teeth of the ring gear by an axially movable wedge. This known arrangement has the same disadvantage as mentioned above. In a further known hinge fitting of the aforementioned kind, two oppositely movable locking bars on one of the hinge members are movable into engagement with the teeth of the ring gear on the other hinge member by a key insertable between pressure faces of the two locking bars. The key is moved in this construction by a tiltable lever provided with a cam slot into which a trunnion integral with the key engages. The return movement of the locking bars is in this construction accomplished by an appropriately chosen inclination of the flanks of the teeth of the ring gear. This construction has the disadvantage that the teeth on the ring gear and the locking bars are liable to wear considerably during extended use and that the noise during racheting of the teeth against each other is disagreeable.

The known hinge fittings of the above mentioned type have the further disadvantage that the two oppositely movable locking bars do not lock the fitting members with out play under all loads acting thereon. In addition, the various elements of the hinge fittings of the known type have to be manufactured to very close tolerances and are also subjected to considerable wear.

SUMMARY OF THE INVENTION

It is an object of the present invention to provide a hinge fitting of the aforementioned kind which avoids the disadvantages of the hinge fitting known in the art.

It is a further oject of the present invention to provide a hinge fitting of the aforementioned kind which is composed of relatively few and simple parts which can be manufactured at reasonable cost and which are subjected during operation to less wear than the hinge fittings known in the art so that the hinge fitting according to the present invention will stand up properly under extended use.

With these and other objects in view, which will become apparent as the description proceeds, the hinge fitting according to the present invention for adjustably connecting a seat element and a backrest element, especially for motor vehicle seats, mainly comprises a first hinge member connectable with one of said elements and a second hinge member connectable with the other element and abutting with an end portion thereof against one face of the first hinge member, in which a ring gear having inwardly directed teeth is provided on the first hinge member, whereas three radially extending locking bars, provided at the outer ends with teeth adapted to meshingly engage with the teeth of the ring gear, are mounted on the second hinge member circumferentially spaced from each other. Means fixed to the second hinge member guide the locking bars movable in radial direction, first cam means turnable about an axis coaxial with the ring gear cooperate with the locking bars for moving the same in radially outward direction to bring the teeth thereon in locking engagement with the teeth of the ring gear to thus hold the hinge members in fixed position relative to each other, and second cam means turnable about the aforementioned axis cooperate with the locking bars for moving the same in radially inward direction to disengage the teeth theron from the teeth of the ring gear to thus permit angular adjustment of the hinge members relative to each other. Preferably, the locking bars are angularly displaced through angles of 120° from each other.

The first cam means preferably comprises a central cam having three circumferentially displaced lobe portions adapted to engage, during turning of the first cam in one direction about its axis, inner ends of the locking bars for moving the same in radially outward direction and the second cam means preferably comprises a disc provided with three cam faces or curved cam slots arranged to respectively engage axially projecting followers on each of the locking bars to move the latter during turning of the disc in a direction opposite to the above mentioned one direction in radially inward direction.

In this construction, a three point support of one of the hinge members on the other will be obtained in the engaged position of the teeth of the locking bars with the teeth of the ring gear and movement of the locking bars to the disengaged position is carried out in a positive manner, independent from any spring forces and independent from the angle of the flanks of the interengaging teeth, so that the latter may be constructed to properly withstand any moment imparted thereto. An additional advantage of the hinge fitting according to the present invention is that is may be constructed with a small overall width and that the diameter of the ring gear may be chosen relatively small without detrimentally effecting the loadability of the hinge fitting.

The means for guiding the locking bars movable in radial direction preferably comprises a guide plate having a central portion located radially inwardly of the ring gear and provided with three channel portions in which the locking bars are respectively received and with three guide flange portions projecting radially beyond the central portion and abutting with one face thereof against the other face of the first hinge member. Each of the channel portions has a wall portion substantially parallel and axially spaced from the second hinge member and the aforementioned guide flange portions are preferably located in one plane with the aforementioned wall portions and formed by tongue-like extensions of the same.

Each of the aforementioned wall portions may be provided with a radially extending slot having parallel side faces and each of the locking bars may be provided with projections or a rib extending into the respective slot movable in radial direction for guiding the respective locking bar movable in radial direction.

The disc forming the second cam means may be arranged in a different manner with respect to the other elements of the hinge fitting. Thus the disc may be arranged to engage the aforementioned wall portions of the guide plate at the side thereof facing away from the locking bars, or the disc may be arranged to engaged the second hinge member on the side thereof facing away from the locking bars. In both arrangements it is advantageous that the axially projecting followers project from the ribs on the locking bar into the curved cam slots provided in the disc.

The construction of the hinge fitting according to the present invention has the advantage that, despite the small dimensions of the various elements of the fitting, the latter may be loaded to a considerable extent without being subjected to excessive wear. Furthermore, the various elements may be manufactured at very reasonable cost. The guide plate may be stamped and the guide channels therein formed during the stamping operations at very reasonable cost. The guide plate may be connected to the second hinge member by screws, rivets or even welded thereto. a screw connection is preferred so that the guide plate may be removed from the second hinge member for replacement purposes, even though replacement will hardly be necessary. If a screw connection is used, such a screw connection preferably extends through fitting members projecting through appropriate bores in the guide plate and the second hinge member, which will result in a construction increasing the loading or carrying capacity thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
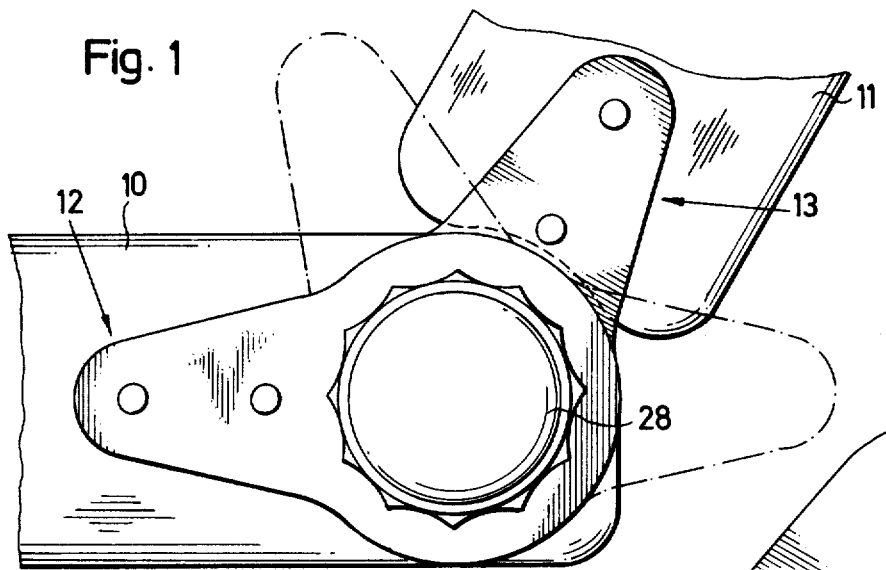
FIG. 1 is a partial side view of a seat for a motor vehicle provided with the hinge fitting according to the present invention, in which various positions of the fitting members connected to the backrest element are indicated in dash-dotted lines.

FIG. 1 partially illustrates a motor vehicle seat comprising a seat element 10 and a backrest element 11. A hinge member 12 is fixedly connected in any convenient manner to the seat element 10 and another hinge member 13 is connected to the backrest element 11. Preferably both sides of the seat are provided with a hinge fitting comprising the hinge members 12 and 13. Both hinge fittings are then together movable by manually operable means to a locked, respectively unlocked position. This is accomplished, in a manner well known in the art, by a shaft acting on the locking means of both hinge fittings.

Figure 3:
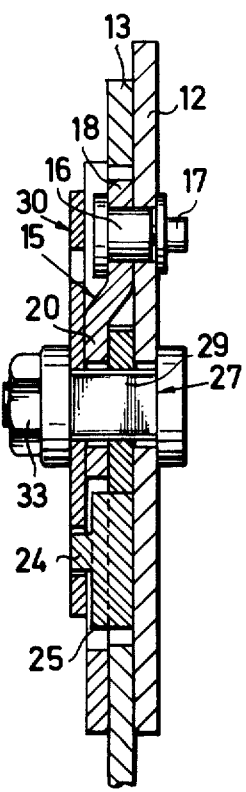
FIG. 3 is a cross section along the line III—III of FIG. 2.

In the embodiment shown in the drawing, end portions of the hinge fittings 12 and 13 abut with side faces thereof against each other. The first hinge fitting 13 is provided at this end portion with a ring gear 14 having radially inwardly directed teeth. A guide plate 15 is detachably connected to the second hinge member 12 by means of screws 17 threaded into fitting members 16 extending through aligned bores in the guide plate 15 and the second hinge member 12. As shown in FIG. 3, the fitting member 16 has at one end thereof facing away from the second hinge member 12 a radially extending flange engaging the guide plate 15 on the side thereof facing away from the second hinge member 12, and the screw 17 is threadingly engaged into a correspondingly threaded bore in the fitting member 16, whereas as washer sandwiched between the head of the screw and the hinge member 12 engages the face of the latter which is directed away from the guide plate 15. The guide plate 15 is provided with three through 120°displaced base portions 18 provided with bores aligned with corresponding bores in the second hinge member 12, through which the fitting members 16 respectively extend, and between these base portions 18 three radially extending guide channels 19 are embossed which together form a central hub 20 provided with a central opening therethrough. Each of the guide channels has a wall portion substantially parallel and axially spaced from the second hinge member and these wall portions are provided with tongue-like extensions located in a plane therewith and forming guide flanges 21 abutting with one face thereof against a face of the first hinge member 13 which is directed away from the second hinge member 12 so that the first hinge member 13 is guided between the hinge member 12 and the flange portions 21 on the guide plate 15.

A locking bar 22 is arranged in each of the guide channels 19 and guided therein for movement in substantially radial direction. Each of the locking bars 22 is provided with a central guide rib 23 projecting from one face thereof into a radially extending slot 25 formed in the guide plate 15 so as to be guided in radial direction. A trunnion or follower 24 projects from each of the ribs 23. Each of the three locking bars 22 is provided at its radially outer and with teeth adapted to meshingly engage the teeth of the ring gear 14.

Figure 2:
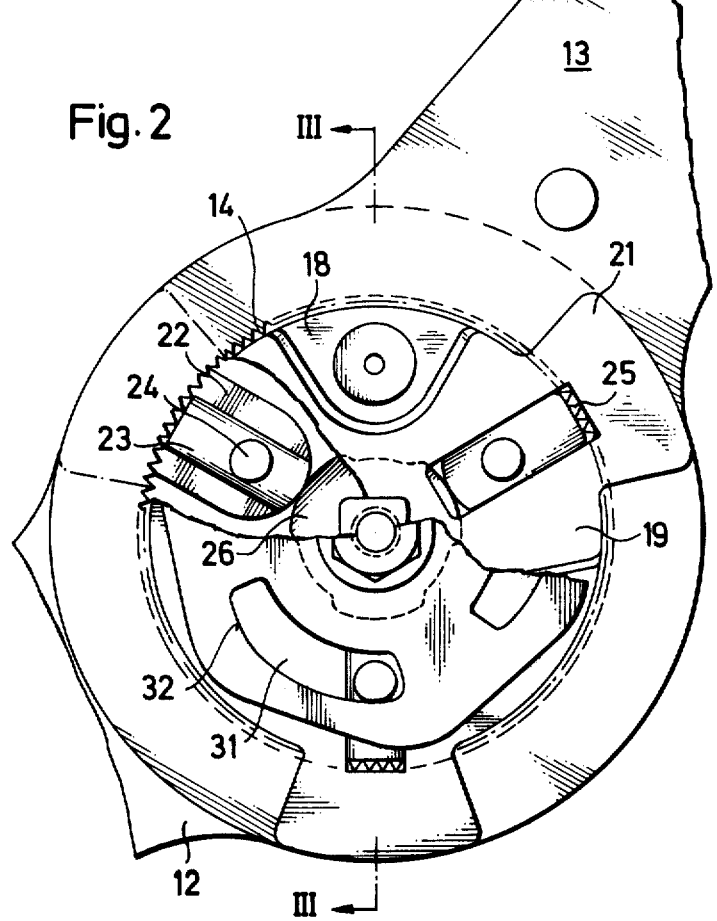
FIG. 2 is an enlarged side view of the hinge fitting according to the present invention with certain elements partially broken away.

First cam means 26 are provided for moving the locking bars 22 in radially outward direction so that the teeth at the outer end thereof will engage with the teeth of the ring gear 14. The first cam means 26 comprise a central plate-shaped cam having three projecting lobes respectively adapted to engage the inner, preferably semicircular-shaped, ends of the locking bars 22 and the cam 26 is mounted on a pivot pin 27 coaxially arranged with the ring gear 14. The pivot pin 27 may be turned about its axis by the knob 28 shown in FIG. 1 connected in any suitable known manner to the right end of the pivot pin, as shown in FIG. 3, which projects beyond the second hinge member 12, or by a lever connected to the aforementioned end of the pivot pin. A spring, not shown in the drawing, is coordinate with the pivot pin 27 in a manner well known in the art to act on the latter directly or indirectly to bias the pivot pin and the cam 26 connected thereto to the position as shown in FIG. 2, in which the locking bars 22 are held in the locking position. The pivot pin 27 has a portion 29 of of non-circular, for instance substantially square cross section on which the cam 26 is mounted so that the cam is turned during turning of the pivot pin. Second cam means 30 are provided for moving the locking bars 22 in radially inward direction so that the teeth at the outer end thereof will become disengaged from the teeth of the ring gear 14. The second cam means 30 comprise a disc, likewise mounted on the non-circular portion 29 of the pivot pin 27 for turning therewith, and the disc is provided with three cam slots 31 through which the followers 24 on the locking bars 22 respectively project and each of the slots 31 has a circular portion coaxial with the axis of the pivot pin and an inwardly directed end portion forming a cam face 32 cooperating with the respective follower in such a manner to move the respective locking bar 22 in radially inward direction when the cam face 32 engages the respective follower 24. The cam faces 32 are arranged in such a manner with respect to the lobes on the central cam 26 so that when the cam faces 32 engage the followers 24, the lobes on the central cam 26 will be displaced from the position shown in FIG. 2 so that the locking bars may move in radially inward direction. A nut 33 screwed onto the outer appropriately threaded end of the pivot pin 27, 29 secures the latter against movement in axial direction.

The first fitting member 13 is turnable guided in the illustrated embodiment between the second hinge member 12 and the guide plate 15 connected thereto, whereby, radial support is accomplished by the abutting of the outer ends of the teeth of the ring gear 14 against the curved circumferential surfaces of the base portions 18 of the guide plate 15, whereas axial support for the first hinge member is provided at one side by its abutment on the second hinge member, and on the other side by the flange portions 21 of the guide plate 15 which is connected to the second hinge member 12 by means of the inserts 16 and the screws 17. During movement of the pivot pin 27, 29, and the cams 26 and 30 connected therewith, in counterclockwise direction, the cam faces 32 in the slots 31 of the cam disc 30 engaging the followers 24 will move the locking bars 22 in radially inward direction so as to disengage the teeth at the outer ends thereof from the teeth on the gear ring 14 so that the hinge members 12 and 13 may be turned with respect to each other to thereby adjust the angular position of the backrest element 11 with respect to the seat element, whereas turning of the pivot pin in the opposite direction to the position as shown in FIG. 2, the lobes on the first cam 26 will engage the inner ends of the locking bars 22 to move the latter in radially outward direction so that the teeth on the outer ends of the locking bars will engage with the teeth on the gear ring 14 to thereby fix the two hinge members in any adjusted position. These latter positions of the two cams may be maintained, as mentioned above, by an appropriate biasing of the pinion 27 by a spring. The provision of three locking bars displaced through 120° from each other will provide, even if the various elements of the hinge fitting have relatively small dimensions, a high loadability of the hinge fitting according to the present invention whereby in addition the operating reliability of the arrangement will not detrimentally influene by a relatively large bearing play.

The illustrated embodiment may be varied in many ways. Thus, the guide slots 25 could also be provided in the second hinge member 12 and the cam disc 30 with the cam slots 31 be then arranged at the right side, as viewed in FIG. 3, of the second hinge member 12. Of course, the followers 24 would then have to project from the right side, as viewed in FIG. 3, from each of the locking bars 22 into the cam slots 31 of the cam disc 30.

It will be understood that each of the elements described above, or two or more together, may also find a useful application in other types of hinge fittings differing from the types described above.

While the invention has been illustrated and described as embodied in a hinge fitting for adjustable connecting a seat element and a backrest element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A hinge fitting for adjustably connecting a seat element and a backrest element, especially for motor vehicle seats, comprising a first hinge member connectable with one of said elements and a second hinge member connectable with the other of said elements abutting with an end portion thereof against one face of said first hinge member; a ring gear having inwardly directed teeth provided on said first hinge member; three radially extending locking bars, provided at the outer ends with teeth adapted to meshingly engage with the teeth of said ring gear, mounted on said second hinge member circumferentially displaced from each other; means fixed to said second hinge member for guiding said locking bars movable in radial direction; first cam means turnable about an axis coaxial with said ring gear and cooperating with said locking bars for moving the same in radially outward direction to bring the teeth thereon in locking engagement with the teeth of said ring gear to thus hold the hinge members in fixed position relative to each other; and second cam means turnable about said axis and cooperating with said locking bars for moving the same in radially inward direction to disengage the teeth thereon from the teeth of said ring gear to thus permit angular adjustment of said hinge members relative to each other.

2. Hinge fitting as defined in claim 1, wherein said locking bars are angularly displaced through, angles of 120° from each other.

3. Hinge fitting as defined in claim 1, wherein said locking bars have radially inner ends spaced from said axis and wherein said first cam means comprises a central cam having three circumferentially displaced lobe portions adapted to engage during turning of said first cam in one direction about said axis said inner ends of said locking bars for moving the same in radially outward direction.

4. Hinge fitting as defined in claim 3, wherein each of said locking bars has an axially projecting follower and wherein said second cam means comprises a disc provided with three cam faces arranged to respectively engage said followers to move, during turning of the disc in a direction opposite to said one direction, said locking bars in radially inward direction.

5. Hinge fitting as defined in claim 4, wherein said cam faces are provided on curved slots in said disc through which said followers respectively extend.

6. Hinge fitting as defined in claim 4, and including means connected to said first and second cam means for simultaneous turning movement above said axis.

7. Hinge fitting as defined in claim 1, wherein said means for guiding said locking bars movable in radial direction comprises a guide plate member having a central portion located radially inwardly of said ring gear and provided with three guide channel portions in which said locking bars are respectively received and with three guide flange portions projecting radially beyond said central portion and abutting with one face against the other face of said first hinge member.

8. Hinge fitting as defined in claim 7, wherein each of said channel portions has a wall portion substantially parallel and axial spaced from said second hinge member, said guide flange portions being located in one plane with said wall portions and forming tongue-like extensions of the same.

9. Hinge fitting as defined in claim 7, wherein said guide plate member is fixedly connected to said second hinge member, and wherein one of said two members is provided with three angularly displaced and radially extending slots, and each of said locking bars being provided with means projecting in a respective one of said slots for guiding the respective locking bar in radial direction.

10. Hinge fitting as defined in claim 9, wherein each of said means projecting into said slots comprises a rib integral with the respective locking bar.

11. Hinge fitting as defined in claim 8, wherein each of said wall portions is provided with a radially extending slot having parallel side faces and each of said locking bars being provided with a rib projecting into the respective slot movable in radial direction for guiding the respective locking bar in said direction.

12. Hinge fitting as defined in claim 9, wherein each of said locking bars has an axially projecting follower, and wherein said second cam means comprises a disc having cam slots respectively cooperating with said followers to move said locking bars in radially inward direction during turning of said disc, said disc engaging that one of said two members which is provided with said radially extending slots.

13. Hinge fitting as defined in claim 7, wherein said guide plate member and said second hinge member are respectively provided with a plurality of circumferentially spaced aligned openings, and including a fitting member in each of said aligned openings and a screw means threadingly connected to each of said fitting members, said fitting members and said screw means having radially projecting end portions respectively engaging said guide plate member and said second hinge member at faces thereof facing away from each other.

14. Hinge fitting as defined in claim 7, wherein said guide plate is a stamped sheet metal part.

* * * * *